United States Patent [19]

Mignien

[11] 4,227,951
[45] Oct. 14, 1980

[54] METHOD OF SPLICING OPTICAL FIBRES DISPOSED IN A LAYER IN A CABLE

[75] Inventor: Georges Mignien, Meyzieu, France

[73] Assignee: Compagnie Lyonnaise de Transmissions Optiques, Clichy, France

[21] Appl. No.: 43,537

[22] Filed: May 29, 1979

[30] Foreign Application Priority Data

May 30, 1978 [FR] France .................. 78 16155

[51] Int. Cl.[2] .................. B65H 69/02; G02B 5/16
[52] U.S. Cl. .................. 156/158; 156/159; 156/304.2; 156/502; 156/304.3; 156/304.5; 350/96.21
[58] Field of Search .............. 156/158, 157, 159, 304, 156/502, 544, 546; 350/96.21, 96.22; 29/630 F, 464, 466, 467, 468

[56] References Cited

U.S. PATENT DOCUMENTS

| 3,864,018 | 2/1975 | Miller ................. 350/96.21 |
| 3,871,935 | 3/1975 | Gloge et al. ............ 156/158 |
| 3,912,574 | 10/1975 | Cherin ................. 156/158 |
| 3,984,172 | 10/1976 | Miller ................. 350/96.21 |
| 4,029,390 | 6/1977 | Chinnock .............. 156/158 |
| 4,043,854 | 8/1977 | Noane et al. ........... 156/159 |
| 4,109,369 | 9/1978 | Taylor ................. 350/96.21 |
| 4,172,746 | 10/1979 | Noane et al. ........... 156/159 |

FOREIGN PATENT DOCUMENTS

| 2,411,814 | 9/1975 | Fed. Rep. of Germany . |
| 2,522,804 | 2/1976 | Fed. Rep. of Germany . |
| 2,367,295 | 5/1978 | France . |
| 1,406,277 | 9/1974 | United Kingdom . |

*Primary Examiner*—Michael W. Ball
*Attorney, Agent, or Firm*—Sughrue, Rothwell, Mion, Zinn and Macpeak

[57] ABSTRACT

A method of splicing optical fibres which are previously disposed in a layer in a cable.

The fibres 1 are released from the tape (2 and 3) in which they are trapped; they are broken and laid in positioning V-grooves (5A) of a plate 12. Adhesive is applied to the fibres and a pressing cover 17 is laid thereon. The adhesive is allowed to set, then the assembly thus formed is sawn in parallel planes (19,20). The remaining portions on either side of the saw planes are then placed end to end again and are pressed against each other and fixed in position. Application to splicing optical fibres of cables formed by assembling flat tapes.

5 Claims, 9 Drawing Figures

U.S. Patent  Oct. 14, 1980  Sheet 1 of 3  4,227,951
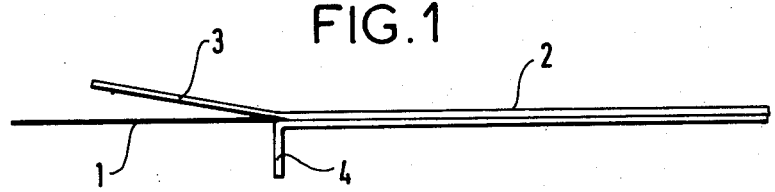
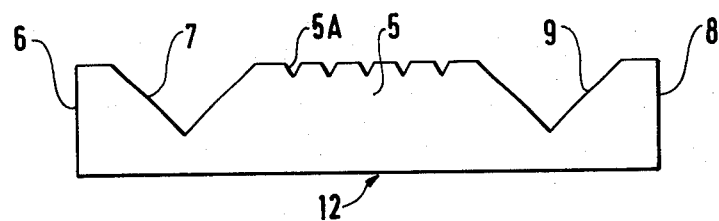
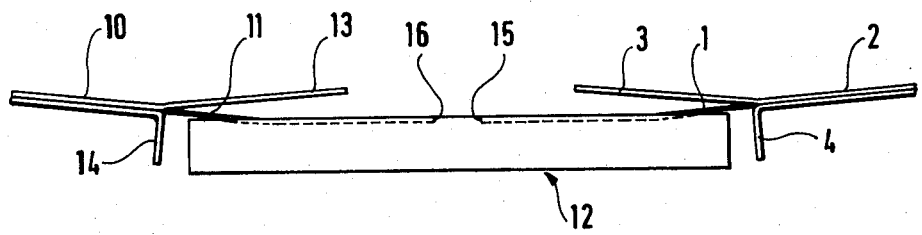
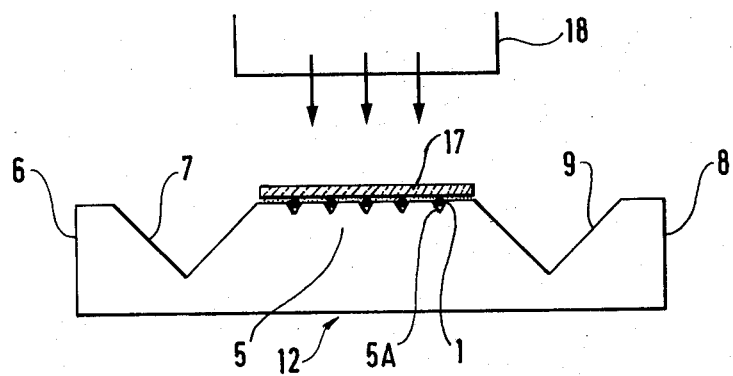

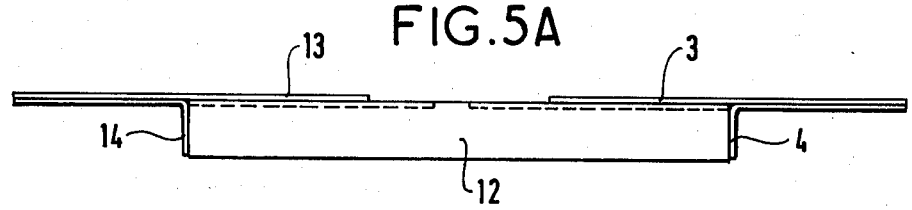
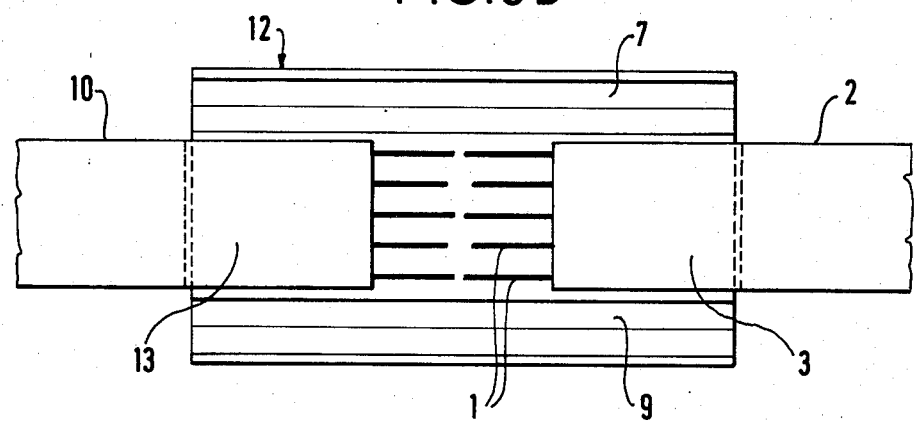
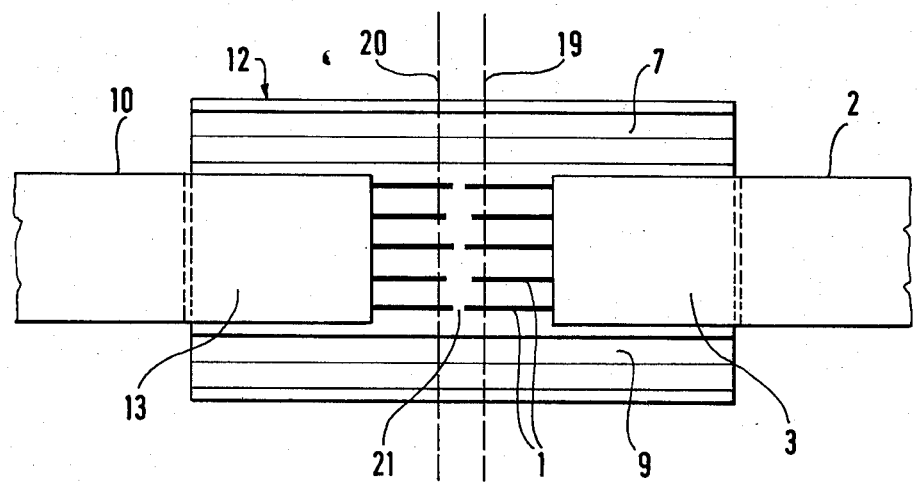

METHOD OF SPLICING OPTICAL FIBRES DISPOSED IN A LAYER IN A CABLE

BACKGROUND OF THE INVENTION

The present invention relates to a method of splicing optical fibres disposed in a layer in a cable, possibly after the layer has been unrolled into a flat tape configuration, said method including the following operations:

(a) the upper and the lower parts of the tape between which the fibres are trapped are serarated;

(b) said upper and lower parts are cut and moved apart along a length which allows a fibre connection zone to be cleared;

(c) the fibres to be spliced are laid in positioning V-grooves in a plate;

(d) adhesive or synthetic resin is applied to a portion of the fibres to be spliced; and (e) the adhesive or synthetic resin is hardened;

In most known optical fibre splicing methods, the fibre are spliced in pairs either by welding or in connectors. This requires accurate alignment of each pair of fibres to be spliced which both lengthy and expensive. Further, the preparation of the fibres before the splicing operation is tricky and makes it difficult to splice cables in the field, since it includes baring, cutting and polishing the fibre ends.

It has also been contrived to splice fibres simultaneously in groups. But these methods require the use of positioning matrices machined with great precision.

Lastly, it has been contrived to dispose fibre ends to be spliced side by side in positioning grooves in two half plates which are symmetrical about an axis which is parallel to the axes of the fibres, to fix the fibres on the plate with drops of adhesive near the non-bared ends of the tapes, to cut the fibres carefully in the plane of symmetry of the plate perpendicularly to the axes of the fibres so as to have cut sections which are truly plane, to remove the excess lengths of fibres and to bring down one of the half plates over the other so as to bring the end surfaces of the fibres into contact with one another.

SUMMARY OF THE INVENTION

The present invention relates firstly to a method of splicing optical fibres which is more simple does not require accurate cutting of the fibre ends, can be used in the field and is, however, inexpensive.

The method according to the invention is characterized in that it further includes the following operations:

before laying the fibres to be spliced in the positioning V-grooves of the plate, their ends are cut without taking special precautions:

the adhesive or the synthetic resin is applied to at least a portion of the length of the fibres to be spliced which are disposed on the plate, up to their ends, then a pressing cover is laid on the lengths of the fibres covered in adhesive or synthetic resin;

when the adhesive or the synthetic resin has hardened, the assembly constituted by the plate, the fibres, the adhesive or synthetic resin and the pressing cover is sawn at a constant spacing in parallel planes and the zone which lies between the sawing planes is removed; and the remaining portions of the plate on either side of the sawing planes are placed again end to end, the fibre ends coinciding, a polymerisable liquid or resin with a refractive index close to that of the fibre cores being interposed, then the remaining portions of the plate are pressed against each other and are fixed in position.

It further includes preferably at least one of the following features:

the plate is disposed horizontally and the ends of the tape are inclined at a small angle with respect to the horizontal so as to facilitate the positioning of the fibres in the V grooves of the plate;

a synthetic resin which can be polymerized by ultra-violet radiation is applied to the fibres, then a pressing cover which allows the radiation to pass through it is pressed on the fibres and the resin is hardened by exposing it to the ultra-violet radiation;

the remaining portions of the plate in the sawing planes are placed end to end, disposing the guide cylinders in the large-sized V-grooves on the sides of the plate, the axes of the grooves being parallel to those of the fibres;

when the remaining portions of the plate have been placed end to end in the sawing planes, the plate is fixed by compressing it between press plates, a deformable cushion being interposed; and to splice optical fibres which are disposed in a cable in a stacked flat tape configuration, the above operations are carried out on each flat tape, then the remaining portions of the plates which are placed end to end are stacked before being fixed.

The invention also relates to a plate for putting into practice the variant of the method in accordance with the invention in which the remaining portions of the plate in the sawing planes are placed end to end, disposing the guide cylinders in the large-sized V-grooves on the sides of the plate, the axes of the grooves being parallel to those of the fibres characterized in that it is rectangularly shaped and has, in its central portion, a row of V-grooves whose width is such that the optical fibres can be laid therein but project in relation to the upper surface thereof are the plate and on each side of the large V-grooves in which the guide cylinders can be laid. Preferably, the plate is made of ductile alloy and formed by stamping in a hard metal press, or of a thermoplastic material which has good dimensional stability (advantageously sulphuretted polyphenylene) and is formed by moulding.

BRIEF DESCRIPTION OF THE DRAWINGS

A method of splicing optical fibres in accordance with the invention and a plate for applying the method are described hereinbelow by way of example with reference to the accompanying drawings, in which:

FIG. 1 illustrates a cross-section of the preparation of the end of a flat tape with several parallel optical fibres;

FIG. 2 illustrates a transversal cross-section of a support plate for the optical fibres to be spliced;

FIG. 3 illustrates a longitudinal cross-section of the way in which the fibres to be spliced on the plate are disposed;

FIG. 4 illustrates a transversal cross-section of the plate with the fibres to be spliced, which are joined together by a polymerizable resin under a pressing cover, the resin being subjected to ultra-violet radiation during polymerization;

FIG. 5A illustrates a longitudinal cross-section of the way in which the upper part and lower part of the tape are fixed to the plate;

FIG. 5B illustrates a plane of the plate and the fibres to be spliced seen from above through the cover and the connecting resin, which is transparent;

FIG. 6 also illustrates a plane of the plate and the fibres to be spliced seen from above through the cover and the connecting resin, which is transparent, with the sawing planes;

DESCRIPTION OF THE PREFERRED EMBODIMENTS

Figure 7:
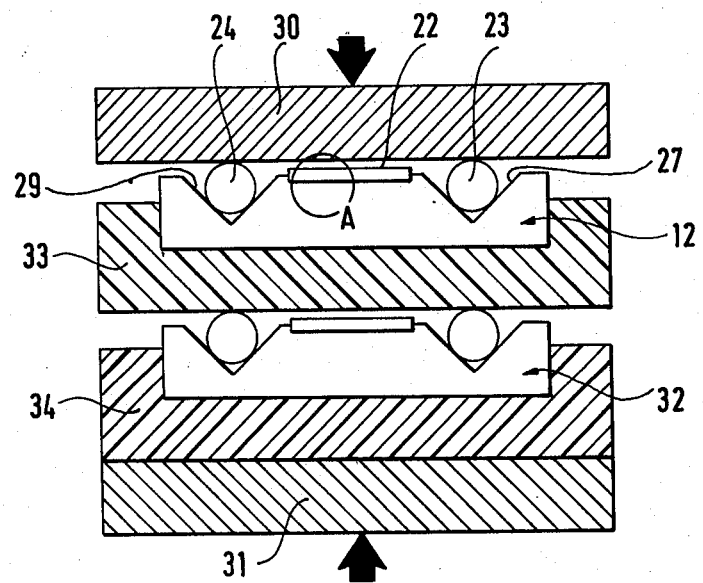
FIG. 7 illustrates a transversal cross-section of two pairs of two half-plates, with the positioning cylinders, and deformable mattresses between two pressing plates.
Figure 8:
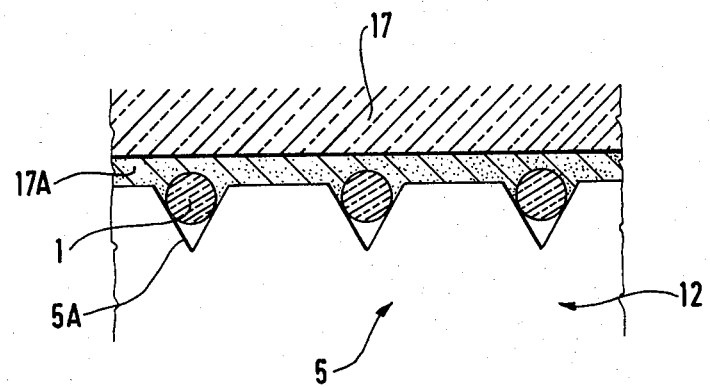
FIG. 8 illustrates on an enlarged scale the detail A in FIG. 7.

A flat tape 2 illustrated in FIG. 1 is an expanded component; each cell contains an optical fibre 1 without any protection other than a primary coating of synthetic resin which is a few microns thick. When the cabling component is cylindrical, the configuration can be made plane by unwinding the cable, so as to allow splicing in accordance with the method of the invention.

The ends of the cabling component are prepared as follows:

the two half tapes 3 and 4 in which the fibres are trapped are opened;

the upper half tape 3 is cut to the suitable length;

the lower half tape 4 is cut to a shorter length;

the two half tapes are positioned so that they do not hinder the following part of the operation. They are parted and the lower half tape is bent back downwards at right angles. This position makes it possible to use the two half tapes subsequently for mechanical fixing on the connection plate; and the fibres are broken to the suitable length but without any special precaution.

The fibres must then be positioned on a precision plate which has as many grooves as there are pairs of fibres to be spliced. A cross-section of such a plate 12 is shown in FIG. 2. It can be made either of stamped ductile metal or of a moulded thermoplastic material.

The plate has a central portion 5 with V-shaped grooves 5A for positioning the fibres, the angle of the grooves being 60° and their depth being about 50% greater than the diameter of the fibres to be spliced. The side parts 6 and 8 have large guide grooves 7 and 9 whose function will be described further on. When the plate is made of ductile metal, e.g. light aluminium alloy known under the name of AU4G, supplied by Pechiney-Ugine-Cuhlmann. It is formed by stamping in a press by means of a treated steel die. When it is made of a thermoplastic material, the material must have good dimensional stability, allow accurate dimensions to be obtained and be able to undergo sawing without deformation. In particular, sulphuretted polyethylene is a suitable material. The machining profile is the same as that of the stamped part.

The side elevation of FIG. 3 shows how the fibres to be spliced are positioned in the plate. The tapes 2 and 10 are inclined at about 5° with respect to the horizontal plane of the upper surface of the plate to facilitate the positioning of the fibres 1 and 11 and their ends 15 and 16 in the grooves of the plate without manual operation. The upper half tapes 3 and 13 remain above the plate; the lower half tapes 4 and 14 remain on either side of the plate.

The connection of the fibres in the plate is illustrated in FIG. 4, a cross-section of the plate being shown. Since the fibres must be held in the bottoms of their recesses, a pressing cover 17 is applied on the fibres 1 after they have been coated with adhesive or resin which compactly assembles the plate, the fibres and the pressing cover together. These three components must be rigidly connected to one another so as to form a compact and undeformable assembly which is suitable for subsequent sawing. A pure polymerized liquid resin to which a photo-ionizing agent has been added is used advantageously for this purpose, said resin (e.g. resin sold under the trade name "resine U.V. 358" supplied by Loctite-Cie also being polymerizable by ultra-violet radiation emitted by a lamp 18. In this case, the pressing cover 17 must be made of glass to allow the raidation to reach the resin, which can be polymerized in a few minutes thereby allowing easy splicing in the field.

As illustrated by the side elevation in FIG. 5A and by the top plan in FIG. 5B, adhesive or resin is used to fix the ends 3, 4, 13 and 14 of the tapes 2 and 10 on the plate.

FIG. 6 illustrates the operation of double sawing the positioning matrix. This operation is necessary, since the ends of the fibres to be spliced are not coplanar and the surface condition of the fibre ends formed by breakage without precaution is not satisfactory.

The assembly formed by the plate, the optical fibres and the pressing cover, fixed together by the polymerized resin, is placed in a jig (not shown) and two saw blades (not shown) which are strictly parallel to and 1 to 3 mm apart from each other. They saw under lubrication, using a diamond cutting lubricant, in planes 19 and 20 which delimit a zone 21 which is to be removed. Care should be taken to see that there are no splinters on the cores of the fibres, that the facing surfaces are strictly plane, that the cut is perpendicular, that there are no vibrations and that the optical fibres are not dirtied by the component materials, resin, materials of the plate and of the pressing cover. The sawing time is about 10 minutes. This is very suitable for splicing in be field.

At the end of sawing, the separated ends of the half plates are cleaned with solvents which remove any dirt from the ends of the fibres. The fibres are then positioned end to end by the two large-sized V's (e.g. 27 or 29 in FIG. 7 which shows two superposed plates 12 and 32) in which stainless steel guide cylinders 23 and 24 are pressed. The half plates are clamped on the cylinders in a plane perpendicular to the layers of fibres by means of deformable india-rubber cushions 33 and 34 which compensate for faults in the surface or the thickness of the various components (plates, cylinders). Several plates associated with the tapes of the cable are stacked and the assembly is held together by means of clips.

Naturally, to eliminate the transmission losses at the air-to-glass interfaces and to reduce the detrimental effects due to the rough surface condition of the sawing of the ends of the fibres, the half plates are pressed against each other's front ends after there has been interposed between them an index adaptor liquid whose refractive index is close to that of the fibre cores (for a detachable connection) or a polymerizable resin of the same refractive index (for a fixed connection).

Although the connection method and plates which have just been described with reference to the figures appear preferable, it will be understood that various modifications can be made thereto without going beyond the scope of the invention, it being possible to replace some operations of the method or some components of the plate by others which could perform an analogous technological function.

I claim:

1. A method of splicing optical fibres which are previously disposed in a layer in a cable such as a layer unrolled into a flat tape configuration, said method including the following steps:
   (a) separating the upper and the lower parts of the tape between which the fibres are trapped;
   (b) cutting said upper and lower parts and moving them apart along a length which allows a fibre connection zone to be cleared;
   (c) laying the fibres to be spliced in positioning V-grooves in a plate;
   (d) applying adhesive or synthetic resin to a portion of the fibres to be spliced; and
   (e) hardening the adhesive or synthetic resin;
   the improvement wherein said method further includes the following steps:
   (f) before laying the fibres to be spliced in the positioning V-grooves of the plate, cutting their ends without taking special precautions;
   (g) applying the adhesive or the synthetic resin to at least a portion of the length of the fibres to be spliced which are disposed on the plate, up to their ends, then laying a pressing cover on the lengths of the fibres covered in adhesive or synthetic resin;
   (h) when the adhesive or the synthetic resin has hardened, sawing the assembly constituted by the plate, the fibres, the adhesive or synthetic resin and the pressing cover at a constant spacing in parallel planes and removing the zone which lies between the sawing planes; and
   (i) placing the remaining portions of the plate on either side of the sawing planes again end to end, the fibres ends coinciding, interposing a polymerisable liquid or resin with a refractive index close to that of the fibre cores between said coinciding fibre ends, and then pressing the remaining portions of the plate against each other and fixing them in position.

2. A method according to claim 1, wherein the plate is disposed horizontally and that the ends of the tape are inclined at a small angle with respect to the horizontal so as to facilitate the positioning of the fibres in the V-grooves of the plate.

3. A method according to claim 1, wherein a synthetic resin which can be polymerized by ultra-violet radiation is applied to the fibres, then a pressing cover which allows the radiation to pass through it is pressed on the fibres and the resin is hardened by exposing it to the ultra-violet radiation.

4. A method according to claim 1, wherein the remaining portions of the plate in the sawing planes, are placed end to end, the guide cylinders are disposed in the large-sized V-grooves on the sides of the plate, the axes of the grooves being parallel to those of the fibres.

5. A method according to claim 1, wherein when the remaining portions of the plate have been placed end to end in the sawing planes, the plate is fixed by compressing it between the press plates with a deformable cushion interposed therebetween.

* * * * *